United States Patent
Asokan et al.

(10) Patent No.: US 9,129,720 B2
(45) Date of Patent: Sep. 8, 2015

(54) SYNTHESIS OF UNIFORM NANOPARTICLE SHAPES WITH HIGH SELECTIVITY

(71) Applicant: William Marsh Rice University, Houston, TX (US)

(72) Inventors: Subashini Asokan, Houston, TX (US); Michael Sha-nang Wong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 268 days.

(21) Appl. No.: 13/653,872

(22) Filed: Oct. 17, 2012

(65) Prior Publication Data

US 2013/0040143 A1 Feb. 14, 2013

Related U.S. Application Data

(62) Division of application No. 12/442,382, filed as application No. PCT/US2008/060129 on Apr. 11, 2008, now Pat. No. 8,313,714.

(60) Provisional application No. 60/911,721, filed on Apr. 13, 2007.

(51) Int. Cl.
| | |
|---|---|
| *H01B 1/02* | (2006.01) |
| *H01B 1/16* | (2006.01) |
| *B82Y 30/00* | (2011.01) |
| *C01B 17/20* | (2006.01) |
| *C01B 19/00* | (2006.01) |
| *C09K 11/56* | (2006.01) |
| *C09K 11/88* | (2006.01) |

(52) U.S. Cl.
CPC . *H01B 1/02* (2013.01); *B82Y 30/00* (2013.01); *C01B 17/20* (2013.01); *C01B 19/007* (2013.01); *C09K 11/565* (2013.01); *C09K 11/883* (2013.01); *H01B 1/16* (2013.01); *C01P 2002/72* (2013.01); *C01P 2002/84* (2013.01); *C01P 2004/04* (2013.01); *C01P 2004/30* (2013.01); *C01P 2004/64* (2013.01); *Y10T 428/2982* (2015.01)

(58) Field of Classification Search
CPC .... C09K 11/08; C09K 11/565; C09K 11/883; C09K 15/02; C09K 15/04; B82Y 30/00; H01B 1/02; H01B 1/16
USPC ........ 117/68; 252/301.4 R, 301.6 R, 301.6 S, 252/301.6 P, 301.6 F, 301.4 S, 301.4 P, 252/301.4 F, 512, 519.4, 519.5, 519.51; 977/773, 813, 815
See application file for complete search history.

(56) References Cited

U.S. PATENT DOCUMENTS

| | | | |
|---|---|---|---|
| 6,855,202 | B2 | 2/2005 | Alivisatos et al. |
| 7,022,910 | B2 | 4/2006 | Guadiana et al. |
| 8,313,714 | B2 | 11/2012 | Asokan et al. |
| 2004/0208825 | A1 | 10/2004 | Carpenter |

FOREIGN PATENT DOCUMENTS

| | | |
|---|---|---|
| EP | 1857575 | 11/2007 |
| EP | JL51775 P | 7/2013 |
| WO | 0229140 | 4/2002 |
| WO | 03054953 | 7/2003 |
| WO | PCT/US08/60129 | 1/2009 |

OTHER PUBLICATIONS

Manna et al., "Controlled growth of tetrapod-branched inorganic nanocrystals," Nature Materials, vol. 2, Jun. 2003, pp. 382-385.
Manna et al., "Synthesis of Soluble and Processable Rod-, Arrown-, Teardrop-, and Tetrapod-Shaped CdSe Nanocrytals," J. Am. Chem. Soc., vol. 122, 2000, pp. 12700-12706.
Mohamed et al., "Synthesis of High Quality Zinc Blende CdSe Nanocrystals," J. Phys. Chem. B Letters, 109, 2005, pp. 10533-10537.
Mohamed et al., "Chemical Synthesis of Optical Properties of Size-Selected CdSe tetrapod-shaped nanocrystals," Chem Phys Chem, 6, 2005, pp. 2505-2507.
Murray et al., "Synthesis and Characterization of Nearly Monodisperse CdE (E=S, Se, Te) Semiconductor Nanocrstallites," J. Am. Chem. Soc., 115, 1993, pp. 8706-8715.
Pang et al., "CdSe Nano-tetrapods: Controllable Synthesis, Structure Analysis, and Electronic and Optical Properties," Chem. Mater., 17, 2005, pp. 5263-5267.
Chen et al., "Synthesis and Characterization of Cadmium Selenide Nanorods Via Surfactant-Assisted Hydrothermal method," J. Am. Ceram. Soc., 88(6), 2005, pp. 1643-1646.
Asokan et al., "Shaped-Controlled Synthesis of CdSe tetrapods using cationic surgactant ligands," Small, 3(2), pp. 1164-1169 (2007).
Wen Yin Lynn Ko et al., "CdSe tetrapod synthesis using cetyltrimethylammonium bromide and heat transfer fluids," J. Mat. Chem., vol. 20, No. 12, 2010, pp. 2474.

*Primary Examiner* — Mark Kopec
*Assistant Examiner* — Haidung Nguyen
(74) *Attorney, Agent, or Firm* — Boulware & Valoir

(57) ABSTRACT

This invention provides non-spherical nanoparticle compositions that are the reaction product of a source of a Group 12, 13, 14, or 15 metal or metalloid; a source of a Group 15 or 16 element; and a source of a quaternary ammonium compound or phosphonium compound; wherein nanoparticle tetrapods comprise 75-100 number percent of the nanoparticle products.

14 Claims, 7 Drawing Sheets

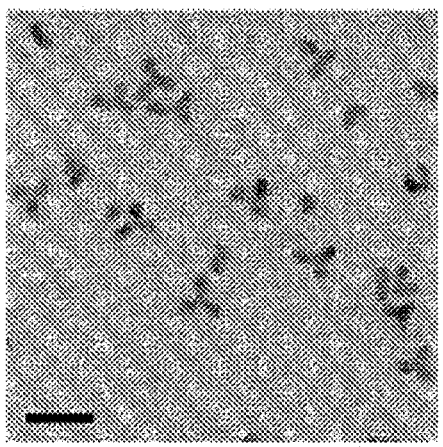 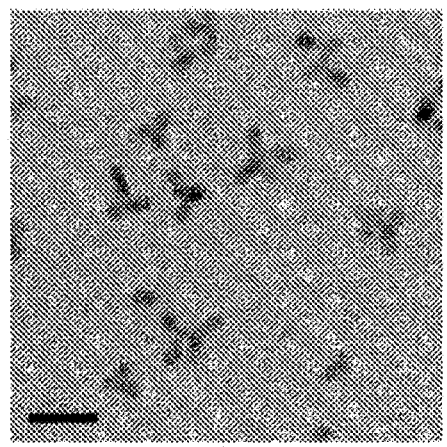
Figure 6A                    Figure 6B

SYNTHESIS OF UNIFORM NANOPARTICLE SHAPES WITH HIGH SELECTIVITY

CROSS-REFERENCE TO RELATED APPLICATIONS

This application is a divisional of Ser. No. 12/442,382 filed Mar. 8, 2008, which is an application under 35 U.S.C. §371 of PCT/US2008/060129 filed Apr. 11, 2008, which claims priority to U.S. Provisional Application 60/911,721 filed Apr. 13, 2007, all of which are incorporated herein by reference in their entirety.

FEDERALLY SPONSORED RESEARCH STATEMENT

This invention was made with the government support under Grant No: EEC-0118007 awarded by the National Science Foundation. The government has certain rights in the invention.

REFERENCE TO MICROFICHE APPENDIX

Not applicable.

FIELD OF THE INVENTION

Embodiments of the invention relate generally to the field of nanoparticle compositions. More specifically, embodiments of the invention relate to nanoparticle compositions that include tetraalkylammonium compounds.

BACKGROUND OF THE INVENTION

With the liquid-phase synthesis routes for nanoparticles of controlled compositions and uniform particle sizes well established, attention has now turned towards control of nanoparticle shape. Up to now tetrapod-shaped crystals with dimensions on the nanometer and micrometer scale have been synthesized for a variety of II-VI semiconductors including ZnO, CdS, CdTe, and CdSe. CdTe tetrapod-shaped nanocrystals have previously been synthesized using CdO as the cadmium precursor in oleic acid (OA)-trioctylphosphine (TOP) system or in a mixture of surfactant of octadecylphosphinic acid (ODPA) and the trioctylphosphine oxide (TOPO)-TOP system, respectively.

The hot injection route—in which molecular precursors are introduced rapidly into a hot ligand-containing organic solvent—was pioneered by Murray et al. (1993 J. Am. Chem. Soc. 115:8706) for the synthesis of photoluminescent CdSe and other metal non-oxide nanoparticles, collectively called quantum dots (sometimes referred to as "QDs"). Quantum dots with rod, rice-like, tetrapod, branched, hollow-shell, and other shapes can be synthesized, though high shape selectivity and size uniformity remain difficult to achieve for nanoparticles with more complicated shapes and compositions.

We note that nearly all hot-injection methods for synthesizing non-spherical quantum dots involve alkylphosphonates (e.g., hexylphosphonics, tetradecylphosphonic, and octadecylphosphonic acids) as a second ligand at high concentrations. They are thought to bind to certain quantum dot faces preferentially and sufficiently to modify growth kinetics, unlike other electron-rich ligands (i.e., phosphine oxide, phosphine, amine, and carboxylate head groups).

Unfortunately, hot injection routes using alkylphosphonates do not produce CdSe tetrapods with high selectivity and the phosphonic acid ligands that are used by these methods are exorbitantly expensive. A method that provides a more cost effective route to nanoscale particles would be useful. A method that also provides improved shape-selectivity, particularly for CdSe tetrapods, would also be useful.

SUMMARY OF THE INVENTION

Embodiments of the methods described herein are directed to the synthesis of nanoparticle tetrapods in high yield, which are otherwise very difficult to synthesize in high yield with reproducibility. Certain embodiments of the method are particularly suitable for synthesizing cadmium selenide tetrapods. The method is easy to carry out experimentally, is environmentally friendly and economically viable, making it particularly useful for the scaled up synthesis of tetrapods. Methods described herein may also be applicable for the synthesis of nanoparticle shapes of other compositions, which may bring advantages to the areas of catalysis such as petroleum refining, chemicals production, and environmental cleanup, or in the electronics industry for printable circuitry, and sensors.

Thus, in one aspect, embodiments of the invention provide a method of making non-spherical nanoparticles, comprising (a) combining under reaction conditions a source of a Group 12, 13, 14, or 15 metal or metalloid; a source of a Group 15 or 16 element; and a source of a quaternary ammonium compound or phosphonium compound; and (b) isolating non-spherical nanoparticles from the resulting reaction mixture.

In another aspect, embodiments of the invention provide a method of making other non-spherical nanoparticle compositions. For example, non-spherical nanoparticle compositions may be prepared by combining a source of a desired metal element with a desired non-metal source or metalloid source in the presence of an ammonium or phosphonium compound. Some typical non-spherical nanoparticles compositions include metal oxides and metal chalcogenides. Particular embodiments employ a source of a transition metal from any of Groups 3-11 of the Periodic Table, more particularly metals of Groups 6-9. Exemplary non-spherical nanoparticle compositions include oxides and chalcogenides of iron and tungsten. Of course, higher order compositions such as ternary and quaternary compositions may be prepared by including more than one metal and/or non-metal sources. For example, some envisioned compositions include bimetallic oxides including, for example, iron, tungsten and oxygen. Other compositions that include two or more metalloid or nonmetal elements such as $CuInSe_2$ or $CdSe_xTe_{1-x}$ may also be prepared.

In other embodiments, non-spherical nanoparticles of a single element may be obtained. In such embodiments, a source of the desired element is combined with a source of the ammonium or phosphonium compound under suitable reaction conditions and thereafter the non-spherical nanoparticle composition of the single element is isolated. Metals from Groups 9 to 12, particularly Groups 10 and 11, more particularly Pd, Pt, Ag, and Ag, most particularly Au, can be used to provide non-spherical compositions of a single element.

The source of quaternary ammonium compound generally have the formula $[(R_1R_2R_3R_4^+)A]_a(X^{-i})_n$ wherein each of R1-R4 is individually selected from the group consisting of hydrogen, C1-C20 linear, branched or cyclic alkyl group or a C6-C20 aryl group, and a C4-C20 linear, branched or cyclic diene; A represents nitrogen or phosphorous; and X is a halide or other suitable anion such as but not limited to a polyatomic anion like sulfate, phosphate, nitrate or carbonate. Of course the relative molar amounts of the anion will be selected such that a=ixn to maintain charge balance of the compound. In particular embodiments, each of $R_1$-$R_4$ is an alkyl group. Some preferred embodiments asymmetrical means that at least one of the $R_1$-$R_4$ alkyl groups is different from the other alkyl groups. One such class of asymmetrical quaternary ammonium compounds is the cetyltrimethylammonium halides, particularly cetyltrimethylammonium bromide. Another class of such compounds is represented by the didodecyldimethylammonium halides, particularly didodecyldimethylammonium bromide. In some embodiments, mono-, di-, or tri-alkyl ammonium halides may be used. One skilled in the art will readily recognize the corresponding phosphonium counterpart compounds.

The metal or metalloid can be any Group 12-15 element. In some methods the metal or metalloid is zinc, cadmium, mercury, gallium, indium, thallium, germanium, tin, lead, antimony, bismuth or a combination thereof. Cadmium is preferred in some embodiments. The metal or metalloid can be provided by any convenient means. Typically, however, the metal or metalloid is provided by a precursor solution, preferably a precursor solution derived for a metal or metalloid oxide source.

Any Group 15 or 16 element may be selected for use in the methods described herein. In some embodiments, the group 15 or 16 element is selected from the group consisting of nitrogen, phosphorous, arsenic, oxygen, sulfur, selenium, tellurium, and combinations thereof. In particular embodiments, sulfur, selenium, or tellurium is preferred. Selenium is most preferred for some embodiments.

While the components may be combined in any order and by any method, some useful embodiments combine the source of the Group 15 or 16 element and the source of a quaternary ammonium compound to form an intermediate mixture. Thereafter, the intermediate mixture is combined with the source of selected metal or metalloid. Thus, in one embodiment of the method according to the invention, the method of making non-spherical nanoparticles includes (a) combining a source of a Group 12, 13, 14, or 15 metal or metalloid and a source of a Group 15 or 16 element to form an intermediate composition; (b) combining the intermediate composition with and a source of a quaternary ammonium compound or phosphonium compound to form a resulting reaction mixture; and (c) isolating non-spherical nanoparticles from the resulting reaction mixture.

In a particular embodiment, the method of making a non-spherical nanoparticle composition, includes (a) heating a source of a Group 12, 13, 14, or 15 metal or metalloid in the presence of an acid to provide a metal or metalloid precursor; (b) reacting a source of a Group 15 or 16 element with the metal or metalloid precursor; and a source of a quaternary ammonium compound or phosphonium compound to form a reaction mixture; to form an intermediate composition; (c) heating the intermediate composition in the presence of a quaternary ammonium compound or phosphonium compound; (d) isolating non-spherical nanoparticles from the resulting reaction mixture.

In certain methods tetrapod-shaped nanoparticles are envisioned and usually preferred. As used herein the term "tetrapod" or "tetrapod-shaped" will be understood by those skilled in the art to mean particles having four arm-like portions formed by the group 12-15 metal or metalloid and the Group 15-16 element. The four arms are generally disposed about a central region of intersection. The arms are generally, but not strictly, disposed in a tetrahedral configuration about the central region.

In other embodiments the method may be characterized as providing a composition wherein non-spherical nanoparticles that comprise at least 75-100 number percent of the nanoparticle products isolated from the reaction mixture. Preferably, the non-spherical nanoparticles comprise tetrapod-shaped nanoparticles. Some embodiments of the methods are able to provide at least about 80, at least about 85, at least about 90, at least about 95, or greater than 99 number percent of non-spherical nanoparticles, preferably tetrapod-shaped nanoparticles. Selectivities for non-spherical nanoparticles may be in the range of 80-90 number percent, or 90-100 number percent in some embodiments. The term "selectivity" is used synonymously with "number percent" for the purposes of this application.

Thus in another aspect, the invention includes a non-spherical nanoparticle composition that comprises the reaction product of a source of a Group 12, 13, 14, or 15 metal or metalloid; a source of a Group 15 or 16 element; and a source of a quaternary ammonium compound or phosphonium compound; the composition comprises at least 75 percent (by number) of the nanoparticle products. Such nanoparticle products comprised of essentially the Group 12-15 metal or metalloid and the Group 15-16 element. The nanoparticles of the composition may also include surface ligands such as the quaternary ammonium or phosphonium compounds or remnants thereof in some cases.

Regardless of the method by which the composition is made, another aspect of the invention includes a composition of non-spherical nanoparticles, wherein the particles comprise: (a) a Group 12, 13, 14, or 15 metal or metalloid and (b) a Group 15 or 16 element; and wherein at least 75 percent of the nanoparticles are tetrapods. The composition may include any of the above-described group 12-15 metal or metalloids and Group 15 or 16 elements or combinations thereof. Particles comprising cadmium and sulfur, selenium, or tellurium are particularly preferred, with selenium being most preferred. In some compositions, the nanoparticle tetrapods comprise at least about 80, at least about 85, at least about 90, at least about 95 or at least about 99 percent or more of the nanoparticle products of the composition.

In some embodiments, the methods and compositions described herein are characterized by particles having defined sizes. One measure of size is the average arm length of the tetrapod particles. In some embodiments, the tetrapods have an arm length ranging from about 5 to about 200 or more nanometers. Other compositions comprise particles with a lower limit on the arm length of about 7.5 nm, about 10 nm, about 15 nm, about 20 nm, about 25 nm, about 50 nm, about 75 nm, about 100 nm, about 150 nm or about 175 nm The upper limit of arm length for some particles in the compositions included herein may be about 10 nm, about 20 nm, about 25 nm, about 50 nm, about 75 nm, about 100 nm, about 150 nm, about 175 nm, about 180 nm, about 185 nm about 190, or about 200 nm. Arm lengths may generally be controlled by selection of proportionate amounts of starting materials. Another measure of the size of the particles is the width of the tetrapod arms. Generally, the width of the arms is less than their length. Typical arm widths range from about 2 nm to about 10 nm, particularly about 2 nm to about 5 nm. Arm length and width are determined from tunneling electron microscope (TEM) or other suitable microscope images.

Some methods and compositions provide nanoparticles that are of substantially uniform size. The term substantially the same size means that the average arm length or width has an acceptable standard deviation. Typically, the standard deviation on the arm length of the particles is less than about 50 percent of the average arm length. In other embodiments, the standard deviation of the arm length is less than 40 per cent, less than 35 percent, less than 30 percent, less than 25 percent, less than 20 percent, less than 15 percent, less than 10 percent, or less than 5 percent of the average arm length. Preferred compositions generally have a standard deviation of less than 20 percent, more preferably less than 15 percent, of the average arm length.

The use of the large class of ammonium compounds enables our invention. These compounds replace the toxic phosphonic acids, which are used in the conventional methods. This approach is experimentally safe and relatively easier to perform. There are no reports of these compounds for hot-injection nanoparticle synthesis. Ammonium and phosphonium compounds are a non-obvious choice as reagents for nanoparticle synthesis, because all other ligands currently used are thought to bind to nanoparticles through coordination/covalent bonds. Ammonium and phosphonium compounds are incapable of covalent bonding. Our results suggest that charge interactions are occurring instead.

BRIEF DESCRIPTION OF THE DRAWINGS

FIG. 6 illustrates representative TEM images of shaped CdSe QDs, synthesized with (a) tetradecylammonium bromide and (b) tetrabutylammonium bromide where the particles were recovered 1 min after injection; all scale bars are 20 nm.

DETAILED DESCRIPTION

| Abbreviations | |
|---|---|
| CTAB | cetyltrimethylammonium bromide |
| DDAB | didodecyldimethylammonium bromide |
| OA | oleic acid |
| ODE | octadecene |
| QD | quantum dot |
| TEM | tunnelling electron microscope |
| TOP | trioctylphosphine |
| XRD | x-ray diffraction |

We report, for the first time, that quaternary ammonium compounds can be used to induce shape formation in quantum dot synthesis and that CdSe tetrapod quantum dots with uniform arm lengths can be synthesized with high selectivity using quaternary ammonium or phosphonium salt compounds. Such "quats" have a cationic structure in which ligand groups surround the nitrogen or phosphorous center. Ammonium and phosphonium quats differ substantially from phosphonate and other electron-rich ligands in that the head group of the quat has a cationic structure containing an electron poor nitrogen or phosphorous atom. This fundamental difference affects the formation of quantum dots and can provide a means to control particle shape.

Thus, we modified the synthesis method for spherical CdSe quantum dots, in which trioctylphosphine selenide (Se precursor) is injected into an octadecene solution of cadmium oleate (prepared from CdO and oleic acid). The quat was introduced into the synthesis by combining it with the Se solution prior to injection at 300° C. The toluene was used to solubilize the quat, and so care was needed to avoid uncontrolled boiling of the reaction volume. The particles were grown at 280° C. and recovered and washed with acetone. Size-selective precipitation was not carried out.

Figure 1:
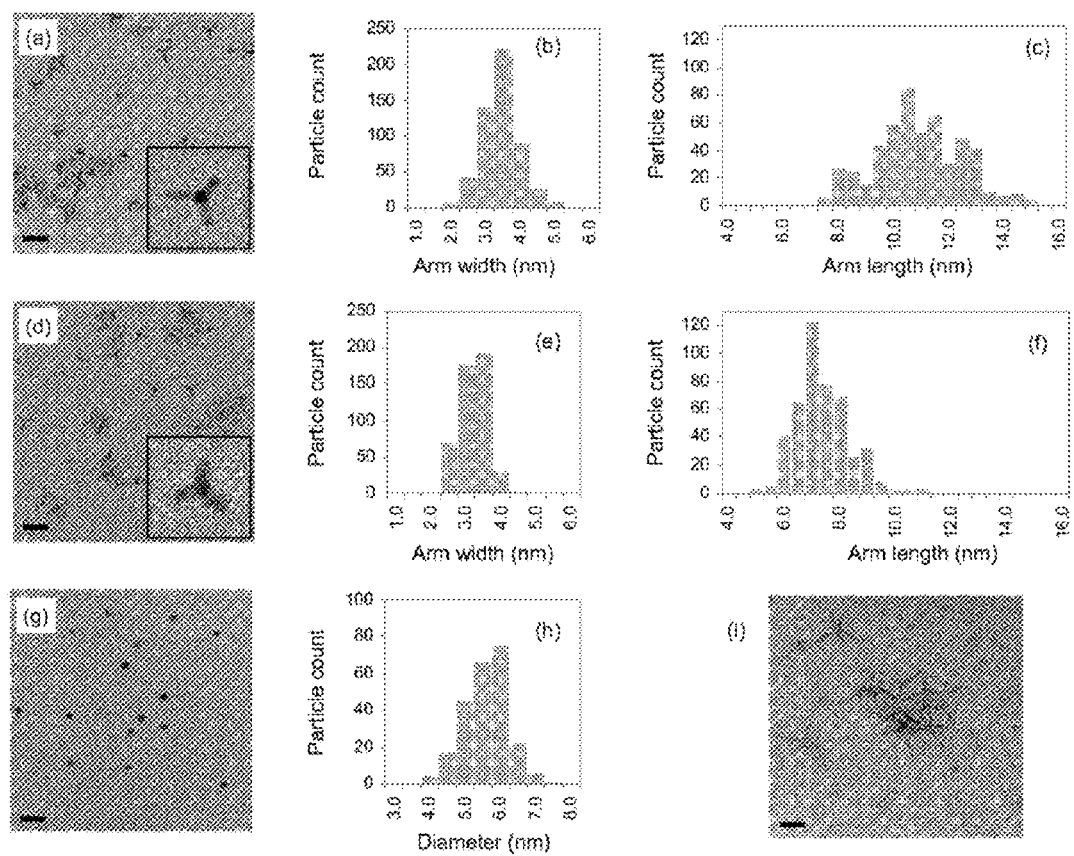
FIG. 1 illustrates representative TEM images of CdSe tetrapods synthesized with (a) CTAB and (d) DDAB; and (g) spherical CdSe QDs synthesized without any quaternary ligand where the particles were recovered 1 min after injection; the insets show higher magnification of individual tetrapod particles; histograms of tetrapod arm width and length distributions for tetrapods synthesized with (b,c) CTAB and (e,f) DDAB, respectively, (h) particle diameter histogram for spherical CdSe QDs, and (i) TEM image of CdSe tetrapods synthesized with CTAB through the slow-decomposition method, and recovered after 1 hr at 300° C.; all scale bars are 20 nm.

The CdSe QDs were unexpectedly found to be tetrapod-shaped when the synthesis was carried out in the presence of cetyltrimethylammonium bromide (FIG. 1a). Tetrapods accounted for 90% of the 500 particles analyzed and the balance was mainly single rods, bipods, and tripods. Defined as the percentage of all observed nanoparticles identified to be tetrapods, the selectivity was 90%. No spherical particles were detected. The mean average arm length and width were 10.9 nm (relative standard deviation=14.0%) and 3.4 nm (15.0%), respectively (FIG. 1b,c). The dimensions of the fourth arm (pointing out of the images and observed as the higher-contrast center) could not be quantified.

Replacing cetyltrimethylammonium bromide with didodecyldimethylammonium bromide, we found that the resultant QDs were also tetrapodal in shape, with a selectivity of 90% (FIG. 1d). With assumed Gaussian size distributions, these particles had a mean average arm length and width of 7.4 nm (13.5%) and 3.2 nm (12.0%), respectively (FIG. 1e,f). Without having to perform selective precipitation, we found that these as-synthesized CdSe tetrapods display higher selectivity towards the tetrapod shape and more uniform dimensions than those previously described. For comparison, we carried out the QD synthesis without using any quats but kept the toluene in the Se precursor solution. Spherical QDs with a mean average diameter of 5.6 nm (10.8%) resulted, indicating that toluene was not responsible for the tetrapod shape (FIG. 1g,h). The monodispersity of these particles could be improved by replacing the toluene co-solvent with a higher-boiling point solvent that can solubilize the quat ligands (thereby allowing for a more rapid injection).

Figure 2:
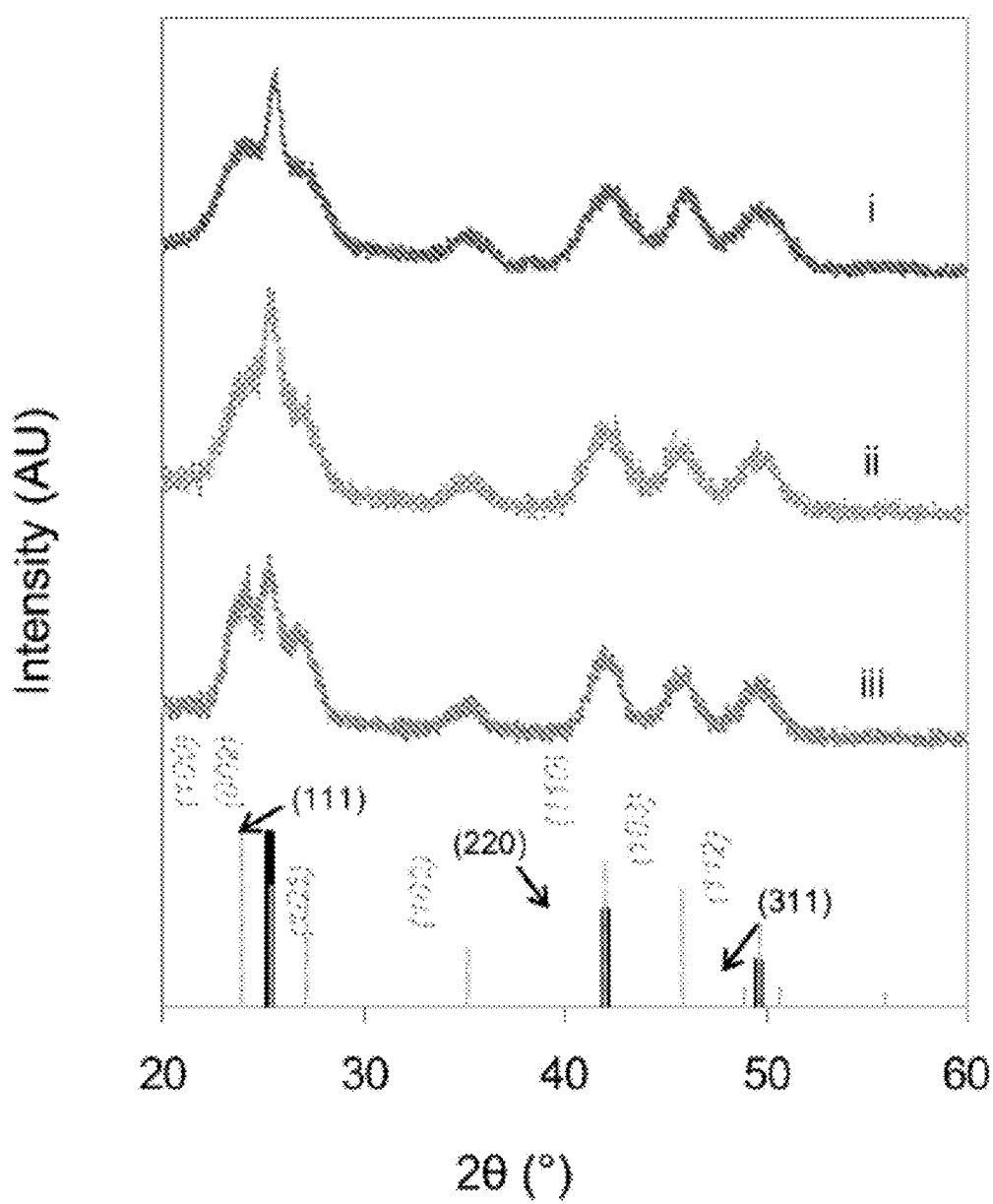
FIG. 2 illustrates XRD patterns of CdSe tetrapods synthesized with (i) CTAB and (ii) DDAB; and (iii) spherical CdSe QDs synthesized without any quaternary ligand; diffraction peaks for the wurtzite and zinc blende (cubic ZnS) crystal structures of CdSe are shown as thin (gray) and thick (black) lines, respectively.

Both tetrapod materials contained the CdSe wurtzite phase as the spherical QDs, according to x-ray diffraction (XRD) analysis (FIG. 2). The more intense and narrow diffraction peak at 28=25° tetrapod arms lengthened in the c-axis direction of the wurtzite phase, as others have found for II-VI tetrapods, Scherrer analysis of the (002) wurtzite peak indicated grain sizes of 7 and 8 nm, respectively, for the cetyltrimethylammonium bromide and didodecyldimethylammonium bromide-derived samples. XRD grain sizes and average TEM particle sizes are volume-weighted and number-weighted averages, respectively, and so a direct comparison of these values to determine the presence of internal defects (i.e., stacking faults and twinning boundaries) cannot be done. For the spherical QDs (FIG. 1g), analysis of the 28 peaks of 24°, of 7.0, 7.7, and 7.9 nm, respectively.

Through the "slow decomposition" synthesis approach to nanoparticles, we found the Se/quat precursor can be combined in one container with the Cd precursor solution and carefully heated to generate the tetrapods. By heating to 300° C. at a ramp rate of 10° C./min and holding at 300° C. for 1 hr, CdSe tetrapods with longer arms (~10-40 nm) were synthesized (Fig. Ii). The tetrapods were less uniform in size and shape, though, and spherical QDs were also formed. The selectivity was estimated to be 8%, and the arm width and arm length were in the ranges of 2.1-3.8 nm and 16-26 nm, respectively. A sudden color change in the reaction medium was observed during the heat ramp at 140° C., indicating initiation of particle nucleation. Nucleation likely continued during the heat ramp, leading to the non-uniform tetrapods and spherical QDs.

Alivisatos and co-workers theorized that phosphonate-assisted QD tetrapod formation is the result of nucleation of zinc blende particles followed by surface-initiated growth of wurtzite arms. High tetrapod selectivities result from the nucleation of zinc blende-only nanoparticles followed by growth of wurtzite-only arms, as in the case of CdTe tetrapods. The cohesive energy difference between the two polymorphs of CdTe is sufficiently large (~10 meV) for zinc blende (and not wurtzite) particles to nucleate, and small enough to allow for the wurtzite phase to grow off the zinc blende nanoparticle surfaces. By extension, low selectivities result from the nucleation of both zinc blende and wurtzite phases. The theory thus suggests that it is inherently difficult to synthesize CdSe tetrapods with high selectivities, since CdSe has a smaller energy difference between its two phases (<1 meV).

Figure 3:
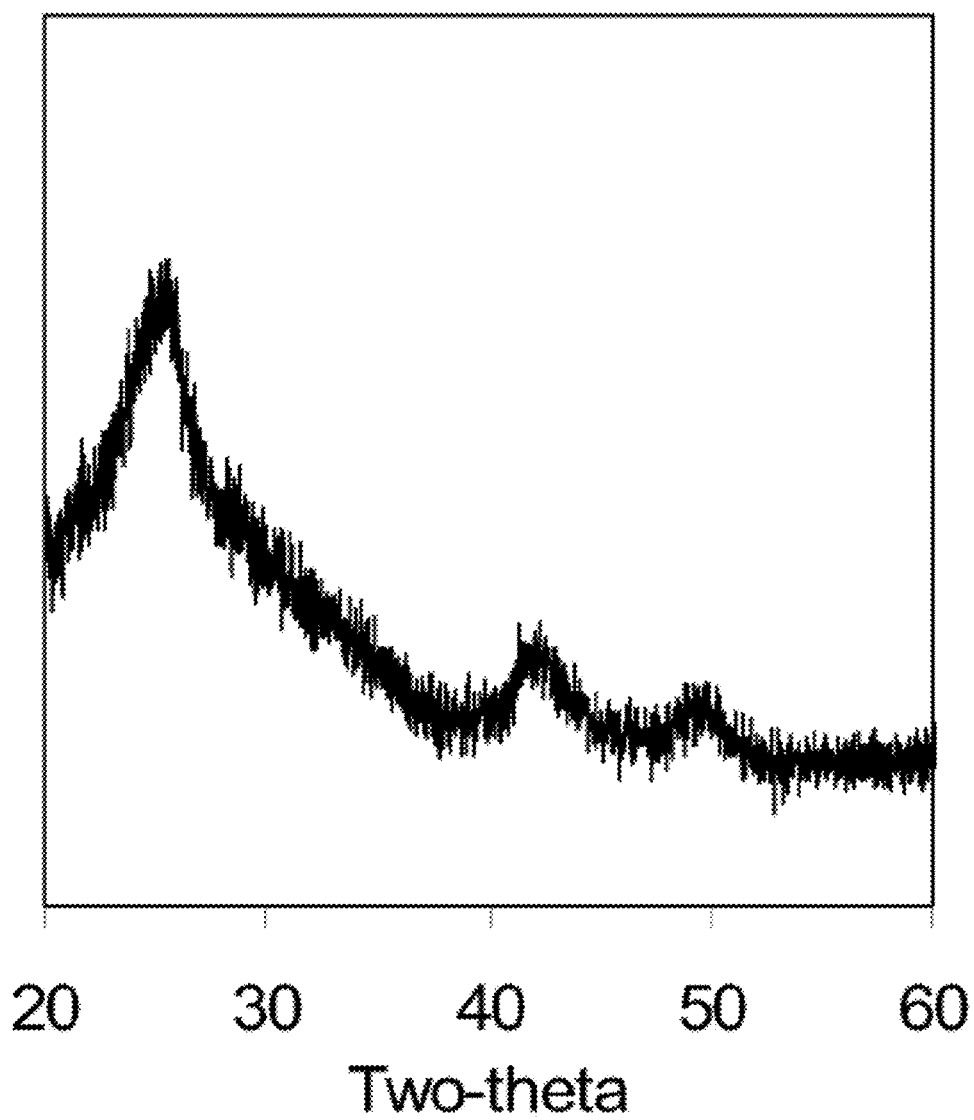
FIG. 3 illustrates pattern of CdSe QDs prepared with 1/12th of the original Se/CTAB precursor amount used for the tetrapod sample of FIGS. 1a and 2 (curve i).
Figure 4:
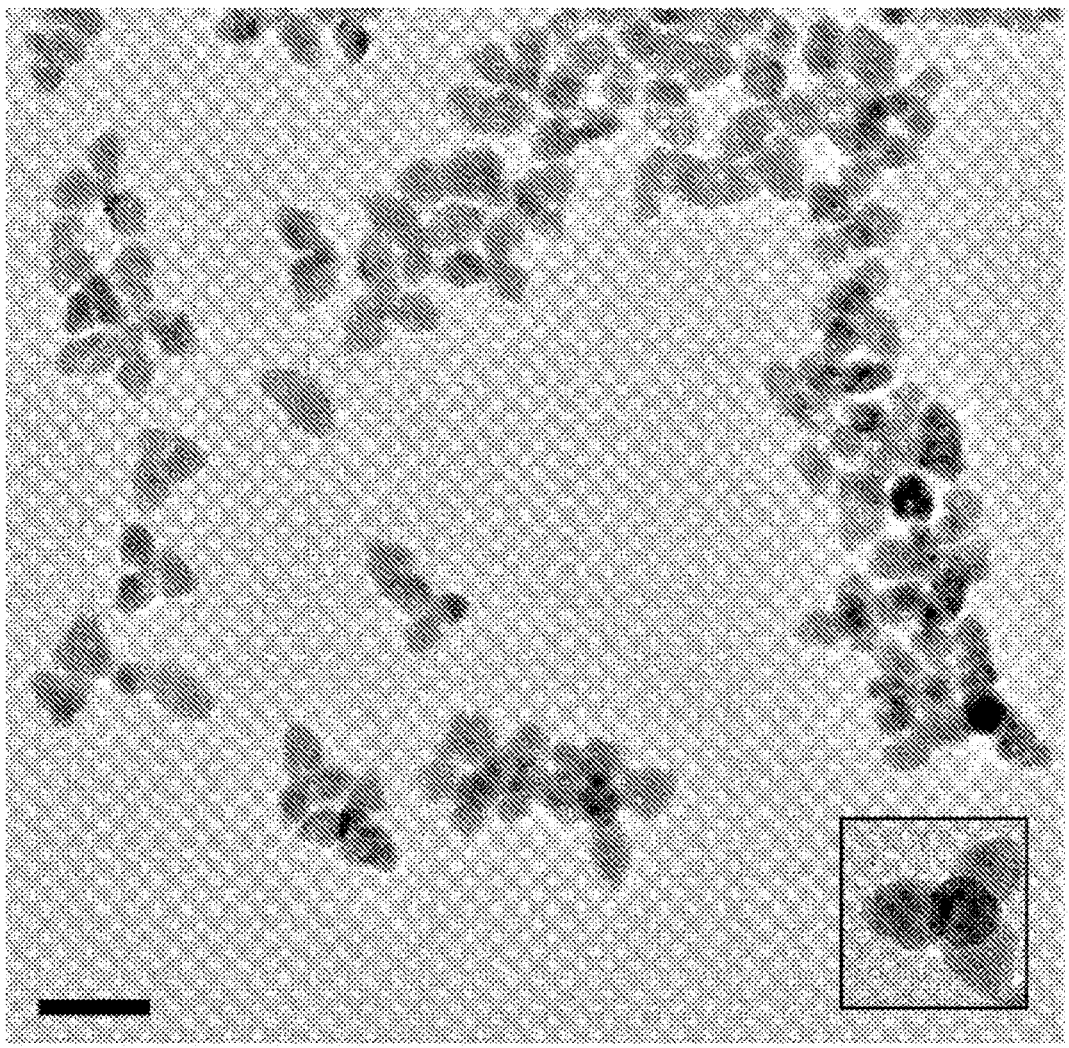
FIG. 4 illustrates representative TEM image of CdSe QDs synthesized with ten times the CTAB amount used for the tetrapod sample of FIG. 1a where the particles were recovered 1 min after injection and the inset shows higher magnification of an individual tetrapod particle; the scale bar is 50 nm.

The high selectivity to CdSe tetrapods with cetyltrimethylammonium bromide or didodecyldimethylammonium bromide ligands suggested the nucleation of zinc blende-only CdSe nanoparticles as one possible mode of formation (FIG. 3). To gather evidence for this, we attempted to recover the NP products at very short synthesis times. We were unsuccessful, thus we sought to separate nucleation from arm growth by significantly reducing the amount of injected Se/quat precursor. The resultant particles had the zinc blende phase, consistent with CdSe nanoparticles nucleating in the zinc blende phase (FIG. 3). The observation that ligands can modify the crystal structure of nuclei is consistent with previous reports.

To gain insight into the structure-directing role of the quats, we explored the effects of quat concentration and quat molecular structure. Increasing cetyltrimethylammonium bromide concentrations led to decreased tetrapod selectivity (down to 30%) in some optimum quat amount that maximizes nucleation of the zinc blende phase and, therefore, CdSe tetrapod selectivity. These particles were detected to be of the wurtzite phase via XRD analysis.

Figure 5:
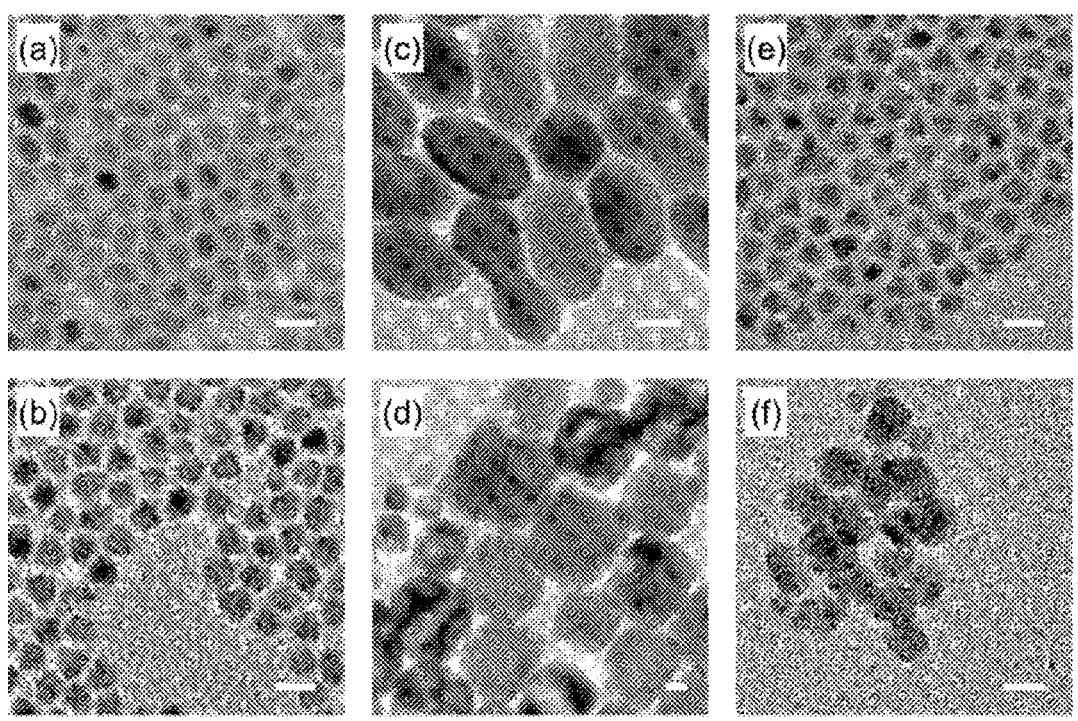
FIG. 5 illustrates TEM images of ZnSe QDs synthesized (a) with and (b) without DDAB; PbSe QDs synthesized (c) with and (d) without DDAB; and CdS QDs synthesized (e) with and (f) without DDAB where the particles were recovered 1 min after injection; all scale bars are 10 nm.

The tetrapod arms were shaped-like petals instead of rods with increased quat amount, indicative of the ligand modifying the growth of the arms. It is presumed that the mode of ligand-particle interaction is electrostatic in nature, because of the cationic nature of the quat head group. We explored the synthesis of QDs of other compositions using didodecyldimethylammonium bromide, and found that the ligand caused a definite change in particle morphology (FIG. 5). Although the tetrapod shape was not formed, the ZnSe, PbSe, and CdS particles were more faceted relative to particles synthesized without the quat. The faceted shapes were reasonably uniform, indicating that quats can be optimized for nanoparticle shape control for various compositions.

There was also significant particle morphology change when symmetric quats (with four equivalent alkyl groups, R=methyl, butyl, octyl, or decyl groups) were tested as ligands. These also led to CdSe tetrapods, but the selectivities decreased significantly. Irregularly shaped QDs (not classifiable as spheres, rods, bipods, tripods, or tetrapods) made up about 50% of the particle population (FIG. 6). These quats modified the particle formation pathway to yield non-spherical, non-uniform CdSe quantum dots, confirming the shape-inducing role of the head group and the importance of quat asymmetry (found in cetyltrimethylammonium bromide and didodecyldimethylammonium bromide) for CdSe tetrapod shape control.

The molecular details of how the quats participate in CdSe zinc blende nucleation and wurtzite arm growth are not yet known, and are the subject of ongoing studies. One possibility is that quats are not active for shape control but that quat degradation products are. Unlike other ligands, quats are known to be susceptible to thermal decomposition via reverse Menschutkin reaction and Hofmann elimination, yielding trialkylamines, HCl, alkenes, and alkyl halides as possible decomposition products. To determine if such compounds play a role in CdSe tetrapod formation, we carried out QD syntheses using trioctylamine, HCl, and a trioctylamine/HCl mixture. Trioctylamine led to spherical CdSe QDs and the other two syntheses led to irregularly shaped particles, indicating that quat decomposition products can modify particle shape but do not lead to CdSe tetrapod formation.

In summary, QD shape control through the use of quats is demonstrated for the first time. The surfactant ligands of cetyltrimethylammonium bromide and didodecyldimethylammonium bromide lead to the formation of CdSe tetrapods with unprecedented high shape selectivity and size uniformity, as established through rigorous TEM analysis. Quats with other structures lead to non-spherical particles, with the faceting the probable result of charge interactions between the quat head group and particle surface. A deeper understanding of these charge interactions and the quat molecular structure effect would lead to greater shape control for a variety of compositions. The use of quats eliminates both the selective precipitation as a purification step and the more costly alkylphosphonate ligands for inducing non-spherical shapes. This new synthesis method offers the important advantages of greener chemistry and scalability, which can further the development of tetrapod-based photovoltaic and electronic devices. Specific illustrative Examples are set out below, but are not intended to be limiting.

Example 1

A cadmium precursor solution was prepared by heating 0.103 g of CdO (0.8 mmol, 99.99 percent, all chemicals by SIGMA-ALDRICH™ unless indicated otherwise) in 20 ml of octadecene ("ODE," 90 percent) containing 2.825 g of oleic acid ("OA," 10 mmol, 90 percent) to 140° C. under argon atmosphere, at which the mixture turned clear and colorless. The Cd solution was cooled to room temperature. The selenium precursor solution was prepared by combining 0.032 g Se metal (0.4 mmol, 99.999 percent) with 1.5 ml of trioctylphosphine (TOP, 90 percent) liquid, and then combined with 2 ml of a toluene solution of the quaternary ammonium compound (0.05 mmol). The quats studied were cetyltrimethylammonium bromide (98 percent), didodecyldimethylammonium bromide (98 percent), tetramethylammonium bromide (99 percent, FLUKA CHEMIKA™), tetrabutylammonium bromide (99 percent, FLUKA CHEMIKA™), tetraoctylammonium bromide, and tetradecylammonium bromide (99 percent, FLUKA CHEMIKA™). The Cd solution was heated at a rate of 10° C./min to 300° C., at which point the Se/quat solution was injected within 6 sec. Caution should be exercised as injecting too rapidly leads to violent boiling of the reaction volume.

Example 2

The cadmium precursor solution ([Cd]=0.8 mM, [oleic acid]=10 mM) was prepared by heating 0.103 g of CdO (99.99 percent) in 20 ml of octadecene ("ODE," 90 percent) containing 2.825 g of oleic acid ("OA," 90 percent) to ~140° C., at which the mixture turned clear and colorless. The Cd solution was then cooled to room temperature. The selenium precursor solution ([Se]=0.4 mM) was prepared by combining 0.032 g Se metal (99.999 percent) with 1.5 ml of trioctylphosphine (TOP, 90 percent) liquid, and then combined with 2 ml of a toluene solution (0.05 mM) of the quaternary ammonium compound (98 percent). The Cd solution was heated at a rate of 10° C./min to 300° C., at which point the Se/quat solution was injected in 6 sec. Caution should be exercised because injecting too rapidly leads to violent boiling of the reaction volume. The synthesis was carried out under argon flow. The reaction temperature dropped to ~280° C. and held at this temperature. Withdrawn aliquots were immediately cooled in a room-temperature water bath. The resultant nanoparticles were recovered by precipitation using acetone, centrifuged and washed with acetone at least 3 times, and then re-dispersed in toluene.

Example 3

The slow decomposition method was used. In this method the Se/cetyltrimethylammonium bromide solution was combined with a cooled Cd precursor solution and heated slowly to 300° C. at the rate of 10° C./min. The reaction flask was kept at 300° C. for 1 hr once the temperature was reached. In the synthesis of zinc blende CdSe QDs, 1/12th of the Se/cetyltrimethylammonium bromide precursor solution was used in otherwise identical hot-injection synthesis conditions. Withdrawn aliquots were immediately cooled in a room-temperature water bath. The resultant nanoparticles were recovered by precipitation using acetone, centrifuged and washed with acetone at least 3 times, and then re-dispersed in toluene.

Comparative Example 4

In the control experiment using trioctylamine, the ligand (0.05 mmol) was combined with toluene (2 ml) and TOPSe solution (0.032 g of Se metal in 1.5 ml of TOP). In the experiment using HCl, an aqueous solution of HCl (1 ml, 1N) was added to the Cd precursor solution (0.8 mmol of CdO, 20 ml of ODE, and 2.825 g of OA) in a three-neck flask. This mixture was carefully heated to 300° C., after which the TOPSe solution (0.032 g of Se metal in 1.5 ml of trioctylphosphine) was injected. For the HCl/trioctylamine experiment, the ligand was injected along with the TOPSe into the HCl/Cd precursor mixture. Growth was maintained at 280° C. Caution should be exercised as heating of the HCl-containing flask can lead to violent boiling of the reaction volume.

Examples 5

In the synthesis of ZnSe QDs, the zinc precursor solution was prepared by heating 1 mmol (0.0813 g) of zinc (II) oxide (99.7 percent, Strem chemicals) in ODE (20 ml) containing OA (2.825 g) to 250° C. under argon atmosphere, at which the mixture turned clear and colorless. In the synthesis of PbSe QDs, the lead precursor solution was prepared by heating 1 mmol (0.223 g) of lead (II) oxide (99.99 percent) in ODE (20 ml) containing 10 mmol of OA (2.825 g) to ~200° C. mixture turned clear and colorless. The selenium precursor solution was prepared by combining 0.039 g of Se powder (0.5 mmol) with TOP (1.5 ml), and then with a toluene solution (2 ml) of didodecyldimethylammonium bromide (0.05 mmol). The solution was heated further to 300° C. at the rate of 10° C./min, after which the Se/didodecyldimethylammonium bromide precursor solution was injected.

Example 6

In the synthesis of CdS QDs, the cadmium precursor solution was prepared by heating 1 mmol (0.128 g) of CdO in ODE (20 ml) containing OA (2.825 g) to 140° C. under argon atmosphere, at which the mixture turned clear and colorless. The sulfur precursor solution was prepared by combining 0.016 g of S powder (0.5 mmol, 99.98 percent with TOP (1.5 ml), and then with a toluene solution (2 ml) of didodecyldimethylammonium bromide (0.05 mmol). The solution was heated further to 300° C. at the rate of 10° C./min, after which the S/didodecyldimethylammonium bromide precursor solution was injected. Withdrawn aliquots were cooled and precipitated with acetone, and washed at least thrice with acetone. The precipitated nanoparticles were then redispersed in toluene.

Comparative Example 7

As a control experiment, we carried out the quantum dot synthesis without using any quats, but kept the toluene in the Se precursor solution. Spherical quantum dots with an average diameter of 5.6 nm (10.8 percent) resulted, indicating that toluene, which is not normally used in quantum dot synthesis, was not responsible for the tetrapod shape (FIG. 1c). The quantum yield of the spherical quantum dots (15.2 percent) was much higher than that of tetrapods (0.30 percent and 0.12 percent for cetyltrimethylammonium bromide- and didodecyldimethylammonium bromide-derived samples, respectively).

Example 8

Characterization Methods

The size and shape of the as-synthesized nanoparticles were examined using a JEOL 2010 high resolution transmission electron microscopy (TEM) operated at 200 kV with a spatial resolution of 0.17 nm. UV-visible absorbance and fluorescence (or photoluminescence, PL) data were acquired at room temperature using a Shimadzu UV-visible spectrophotometer (UV-2401PC model) and a SPEX fluorimeter (Fluoromax-3 model), respectively. The PL spectra were collected between 400 and 750 nm using an excitation wavelength of 380 nm. Quantum yield (QY) analysis was performed using Rhodamine 6G in water as the standard (QY=95 percent) and an excitation wavelength of 488 nm. QY calculations described by Jobin Yvon Ltd. (See for example, http://www.jobinyvon.com/usadivisions/fluorescence/applications/quantumyieldstrad.pd f) were followed. Particle size analysis of TEM images was carried out using ImageJ (Version 1.33, NIH) software, on 500 sizes of 0.5 nm, such that nanoparticles in the range of 3.5±0.25 nm were counted to have a size of 3.5 nm, for example. For x-ray diffraction (XRD) analysis, the recovered particles were dispersed in toluene, deposited on a clean glass slide, and left to dry. A Rigaku Ultima II vertical Θ-Θ powder diffractometer using Cu Kα radiation (A=1.5418) with Bragg-Brentano para-focusing optics was used.

Example 9

Changes in the injection and growth temperatures have a significant effect on the morphology and the optical properties of the as-prepared CdSe tetrapods. The injection temperature is the temperature of the reaction flask prior to injection of the selenium precursor; the growth temperature is the temperature of the reaction flask after this injection. With decreasing temperatures, the CdSe tetrapod arms become longer and narrower (Table A). Also, the selectivity to CdSe tetrapods decreases. The injection/synthesis temperatures of 160/130° C. are too low for the particles to form. The growth temperature is set 20 or 30° C. below the injection temperature; any growth temperature that is lower than the injection temperature should lead to similar trends.

TABLE A

Effect of injection and synthesis temperatures on tetrapod properties at a synthesis time of 1 minute

| Injection/synthesis temp (° C.) | Arm length nm | Arm width nm | Selectivity % |
|---|---|---|---|
| 300/280 | 10.9 | 3.4 | 90 |
| 280/250 | 10.92 | 3.06 | 88 |
| 250/220 | 14.09 | 2.59 | 89 |
| 220/190 | 17.6 | 2.1 | 95 |
| 190/160 | 18.2 | 2 | 93 |
| 160/130 | n/a | n/a | 20 |

With increasing synthesis time, it is observed that the tetrapod selectivity decreases (Table B) at all injection/synthesis temperatures except 160/130° C. In contrast, the selectivity improves with time for 160/130° C.

TABLE B

Effect of synthesis times on tetrapod selectivity at different injection and synthesis temperatures.

| Injection/synthesis temperatures (° C.) | Synthesis times | Selectivity % |
|---|---|---|
| 300/280 | 1 min | 90 |
|  | 5 min | 74 |
|  | 15 min | 53 |
|  | 30 min | 46 |
|  | 60 min | 8 |
| 280/250 | 1 min | 88 |
|  | 5 min | 78 |
|  | 15 min | 58 |
|  | 30 min | 38 |
|  | 60 min | 3 |

TABLE B-continued

Effect of synthesis times on tetrapod selectivity at different injection and synthesis temperatures.

| Injection/synthesis temperatures (° C.) | Synthesis times | Selectivity % |
|---|---|---|
| 250/220 | 1 min | 89 |
|  | 5 min | 76 |
|  | 15 min | 65 |
|  | 30 min | 35 |
|  | 60 min | 10 |
| 220/190 | 1 min | 95 |
|  | 5 min | 90 |
|  | 15 min | 82 |
|  | 30 min | 79 |
|  | 60 min | 71 |
| 190/160 | 1 min | 93 |
|  | 5 min | 88 |
|  | 15 min | 85 |
|  | 30 min | 80 |
|  | 60 min | 74 |
| 160/130 | 1 min | 20 |
|  | 5 min | 32 |
|  | 15 min | 45 |
|  | 30 min | 56 |

Using different Cd:Se precursor ratios led to the formation of CdSe tetrapods (Table C). No trends in arm length or width were observed. The 2:1 system exhibited the highest selectivity (93%). The other systems exhibited lower selectivities, based on the transmission electron microscopy results; quantification was not performed.

TABLE C

Effect of Cd:Se precursor ratio on tetrapod selectivity.

| Cd:Se ratio | Arm length nm | Arm width nm | Selectivity % |
|---|---|---|---|
| 2:1 | 18.2 | 2 | 93 |
| 1:1 | 12.9 | 2.59 | n/a |
| 4:1 | 7.8 | 2.38 | n/a |
| 1:2 | 12.9 | 1.86 | n/a |

The CdSe tetrapod synthesis method was modified from a single injection of TOPSe/CTAB precursor solution to multiple injections of smaller volumes of the TOPSe/CTAB precursor solution. This modification showed the tetrapod arms grew in length and width significantly with every injection. The tetrapod selectivity values ranged from ~70-90%.

TABLE D

CdSe tetrapod properties at different precursor injection numbers

| Injection number | Injection time (min) | Synthesis time (min) | Arm length nm | Arm width nm | Selectivity % |
|---|---|---|---|---|---|
| 1 | 0 | 1 | 10.11 | 3.3 | 89 |
| 2 | 5 | 6 | 16.82 | 3.4 | 87 |
| 3 | 10 | 11 | 22.35 | 3.8 | 79 |
| 4 | 15 | 16 | 28.6 | 4.6 | 82 |
| 5 | 20 | 21 | 38.5 | 6.6 | 72 |

The above-described examples demonstrate that the CdSe quantum dots were tetrapod-shaped when the synthesis was carried out in the presence of cetyltrimethylammonium bromide. The tetrapods accounted for 90 percent of the 500 particles analyzed, with the balance comprised of single rods, bipods, and tripods. No spherical particles were detected. The average arm length and width were 10.9 nm (relative standard deviation=14.0 percent) and 3.4 nm (15.0 percent), respectively. The dimensions of the fourth arm (pointing out of the image and observed as the higher-contrast center) could not be quantified (FIG. 2).

Even without selective precipitation, the CdSe tetrapods were synthesized with higher shape selectivity and dimensional uniformity than previously reported. It has been speculated that CdSe tetrapods (with a zinc blende center and wurtzite arms) are difficult to synthesize because the small energy difference between the crystal phases leads to limited phase control, and therefore low size and shape uniformity.

While not wishing to be held to a particular theory, it is believed that the quats lead to the nucleation of just zinc blende CdSe seeds on which the four wurtzite arms grow, resulting in high selectivity for tetrapods. The nucleation and growth kinetics of the tetrapods are thought to be too rapid for particle recovery at the shortest synthesis times. Thus to moderate arm growth, the amount of injected Se/quat precursor is reduced and the synthesis is carried out under the same conditions. Indeed, the resultant particles are found to have the zinc blende phase (FIG. 5). They are sphere-like particles, suggestive of zinc blende CdSe seeds prior to arm growth.

Figure 7:
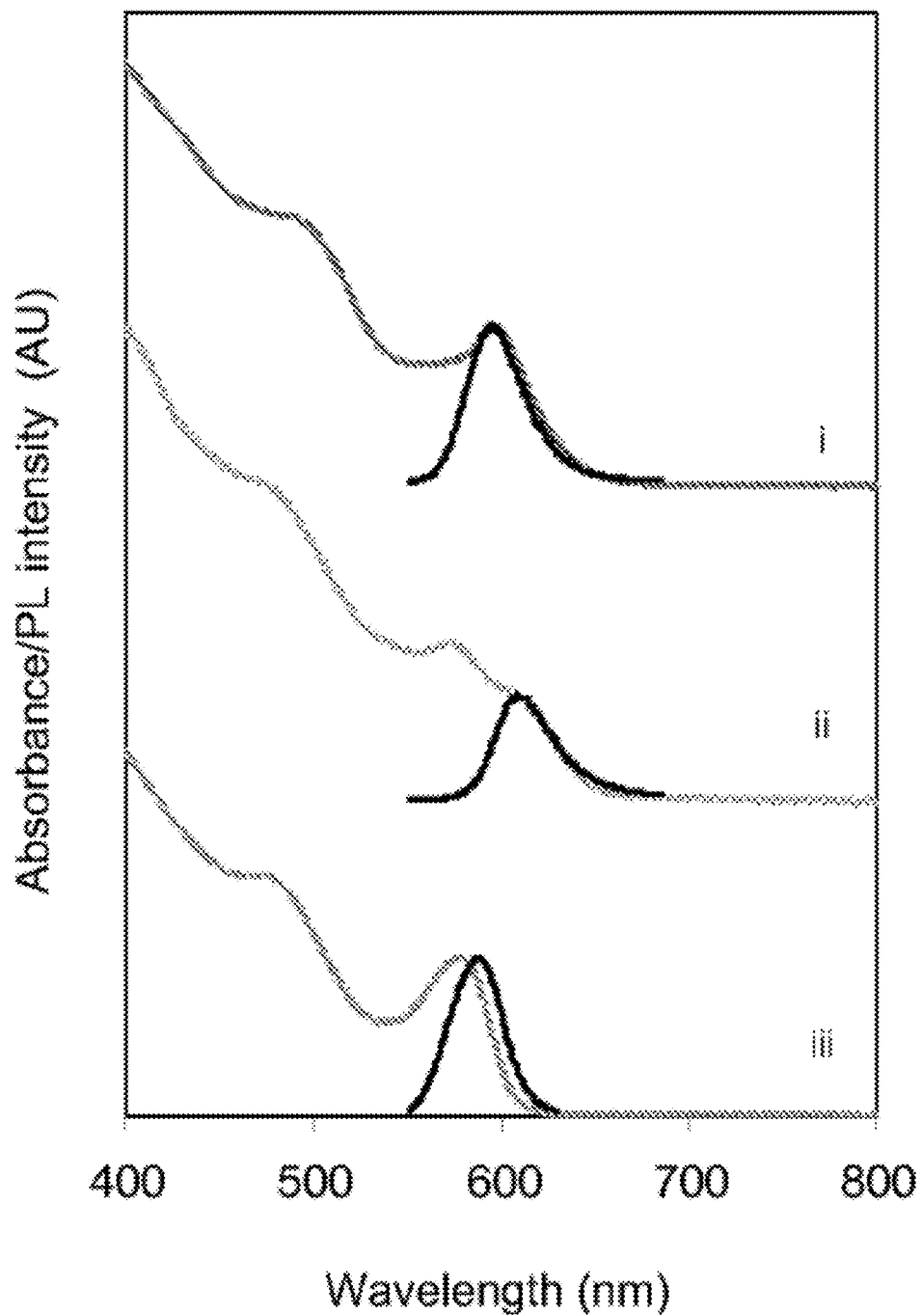
FIG. 7 illustrates UV-vis absorbance (light or dark gray) and photoluminescence spectra (black) of CdSe tetrapods synthesized with (i) CTAB and (ii) DDAB; and (iii) spherical CdSe QDs synthesized without any quaternary ligand where the particles were recovered 1 min after injection.

The electronic structure of tetrapods is more complex than that of their spherical counterpart, making interpretation of their optical spectra difficult. The CTAB-derived tetrapods had an absorbance spectrum shape similar to reported spectra of CdSe and CdTe tetrapods. The first absorption peak was located at 597 nm, and the second peak was at ~497 nm. Unusually, the photoluminescence (PL) peak was centered at 595 nm (FIG. 7, curve i), suggesting that these tetrapods exhibit particle size-dependent quantum yields like CdSe QDs. The measured quantum yields of the tetrapods (0.30% and 0.12% for CTAB- and DDAB-derived samples, respectively) were lower than that of the spherical QDs (15.2%), consistent with previous reports. The absorbance of DDAB-tetrapods was different from that of CTAB-tetrapods, in which the first and second absorbance peaks were located closely to one another (610 and 574 nm, FIG. S3, curve ii), resembling the spectrum reported by Mohamed et al. These authors attributed the higher-wavelength peak to the zinc blende core diameter and the other peak to arm length. For CdTe tetrapods, Alivisatos and co-workers reported that optical absorbance was dependent on arm width and not arm length. Further studies are being carried out.

In summary, QD shape control through the use of quats is demonstrated for the first time. The surfactant ligands of CTAB and DDAB lead to the formation of CdSe tetrapods with unprecedented high shape selectivity and size uniformity, as established through rigorous TEM analysis. Quats with other structures lead to non-spherical particles, with the faceting the probable result of charge interactions between the quat head group and particle surface. A deeper understanding of these charge interactions and the quat molecular structure effect will lead to greater shape control for a variety of compositions. The use of quats eliminates both the selective precipitation as a purification step and the more costly alkylphosphonate ligands for inducing non-spherical shapes. This new synthesis method offers the important advantages of greener chemistry and scalability, which can further the development of tetrapod-based photovoltaic and electronic devices.

There are several possible hypotheses to explain the role of quats in tetrapod formation: (1) quat induces the nucleation of zinc blende CdSe; (2) the ammonium head group binds to particular CdSe surfaces during growth; (3) quantum dot formation occurs inside reverse micelles; and (4) quats decompose into shape-inducing surface ligands. Concerning the last hypothesis, quats are known to be susceptible to thermal decomposition via reverse Menshutkin reaction and Hofmann elimination. Trioctylamine and HCl are possible decomposition products of quats, and so we carried out quantum dot syntheses using trioctylamine, HCl, and a trioctylamine/HCl mixture. Trioctylamine yielded spherical CdSe quantum dots and the other two syntheses led to irregularly faceted particles. Thus, quat decomposition did not appear to be an important factor in tetrapod synthesis.

While the invention has been described with a limited number of embodiments, these specific embodiments are not intended to limit the scope of the invention as otherwise described and claimed herein. Variations and modifications therefrom exist. For instance, dimensions of the nanoparticles of various shapes and compositions can be easily controlled by varying reaction parameters such as, but not limited to, precursor concentration, injection temperature, growth temperature and growth time. For example, lower reaction temperatures are believed to promote the growth of longer arms. Thus, reactions performed at temperatures in the range of 160° C.-190° C. reaction temperatures, specifically injection around 190° C. followed by reaction temperatures of about 160° C., may provide nanoparticles having arms much longer than even 200 nm. Thus, various compositions of nanoparticles (oxides, sulfides, selenides, metals, tellurides of transition metal elements) should be readily obtainable using the described methods. Shapes other than tetrapods, such as rods, bipods, and tripods should also be obtainable by proper selection of the quaternary compound and control of the reaction parameters. Mixtures of quaternary compounds may be used. Nanoparticle shapes of mixed compositions may also be prepared, such as core/shell compositions and "bar-coded" compositions. Heat-transfer fluids, besides octadecene, may be used in some embodiments. Embodiments of the methods described herein may also be extended to the formation of hollow anisotropic nanoparticles of various compositions. Finally, some non-spherical nanoparticles may have advantageous or unexpected properties such as higher quantum yield fluorescence compared to other nanoparticles of corresponding compositions. Compositions having a quantum yield of about 5-10% or more can be obtained.

In addition, particular embodiments of the invention provide one or more of the following advantages. The tetrapods with high selectivity can be produced and hence no size sorting procedures are needed. The cost of the synthesis is reduced by 200 times making it a favorable method for scaling up of the tetrapod production. The quaternary ammonium compounds are biodegradable and safe thereby making this method green and environmental friendly.

Finally, any number disclosed herein should be construed to mean approximate, regardless of whether the word "about" or "approximate" is used in describing the number. The appended claims intend to cover all such variations and modifications as falling within the scope of the invention.

What is claimed is:
1. A non-spherical nanoparticle composition, comprising:
   (a) a Group 12, 13, 14, or a first Group 15 metal or metalloid;
   (b) a second Group 15 or a group 16 element; and
   (c) a quaternary ammonium compound or phosphonium compound;
wherein at least 75 number percent of nanoparticles in said nanoparticle composition are tetrapods.

2. The composition of claim 1, wherein the metal or metalloid is selected from the group consisting of zinc, cadmium, mercury, gallium, indium, thallium, germanium, tin, lead, antimony, and bismuth.

3. The composition of claim 1, wherein the metal or metalloid is cadmium.

4. The composition of claim 1, wherein the Group 15 or 16 element is selected from the group consisting of nitrogen, phosphorous, arsenic, oxygen, sulfur, selenium, and tellurium.

5. The composition of claim 1, wherein the Group 15 or 16 element is sulfur, selenium or tellurium.

6. The composition of claim 1, wherein the quaternary ammonium compound is selected from the group consisting of tetraalkylammonium compounds.

7. The composition of claim 6, wherein the tetraalkylammonium compound is asymmetrical.

8. The composition of claim 1, wherein the quaternary ammonium compound is cetyltrimethylammonium.

9. The composition of claim 1, wherein the quaternary ammonium compound is didodecyldimethylammonium.

10. The composition of claim 1, wherein nanoparticle tetrapods comprise 80 to 100 number percent of the nanoparticle in said nanoparticle composition.

11. A composition of non-spherical Quantum Dots (QDs), wherein said QDs are at least 75% non-spherical and were made with a quaternary ammonium or phosphonium precursor having the formula $$[(R_1R_2R_3R_4^+)A]_a(X^{-1})_n$$

wherein each of $R_1$-$R_4$ is individually selected from the group consisting of hydrogen, C1-C20 linear, branched or cyclic alkyl group or C6-C20 aryl group, and a C4-C20 linear, branched or cyclic diene; A represents nitrogen or phosphorous; and X is halide, sulfate, phosphate, nitrate, or carbonate.

12. The composition of claim 11, wherein said QDs are at least 85% non-spherical.

13. The composition of claim 12, wherein said QDs are at least 95% non-spherical.

14. A non-spherical nanoparticle composition, comprising:
 (a) Cadmium;
 (b) Selenium; and
 (c) Cetyltrimethylammonium or didodecyldimethylammonium;

wherein at least 85 number percent of nanoparticles in said nanoparticle composition are tetrapods.

* * * * *